United States Patent [19]

Hardee et al.

[11] 4,243,970

[45] Jan. 6, 1981

[54] OPEN CIRCUIT ALARM

[76] Inventors: Patrick C. Hardee, 6923 S. Cherry St.; Malin L. Jacobs, 7022 S. Dexter St., both of Littleton, Colo. 80122

[21] Appl. No.: 27,607

[22] Filed: Apr. 6, 1979

[51] Int. Cl.$^3$ .............................................. G08B 21/00
[52] U.S. Cl. ..................... 340/52 D; 307/9; 307/126; 307/141; 340/27 R; 340/522
[58] Field of Search ............... 340/52 D, 52 E, 27 R, 340/522, 644; 307/9, 126, 141

[56] References Cited
U.S. PATENT DOCUMENTS

| | | | |
|---|---|---|---|
| 3,860,904 | 1/1975 | Andersen | 340/52 E |
| 4,107,645 | 8/1978 | Lewis et al. | 340/52 E |
| 4,127,847 | 11/1978 | Stifter | 340/27 R X |

*Primary Examiner*—John W. Caldwell, Sr.
*Assistant Examiner*—Joseph E. Nowicki
*Attorney, Agent, or Firm*—Richard D. Law

[57] ABSTRACT

A timing circuit for sounding an alarm for left-on main power switches, particularly in aircraft, includes a detector circuit for a secondary circuit of a complete circuit, a clock circuit controlled by the main power switch and an audioalarm circuit activated by the clock circuit when the main power switch is left on for a predetermined time following shut off of the secondary circuit.

5 Claims, 2 Drawing Figures

OPEN CIRCUIT ALARM

BACKGROUND OF THE INVENTION

This invention relates to a circuit for connection of multiple branch circuitry for providing an alarm for indicating that the main power switch has been accidently left on.

Propeller driven aircraft have an extensive electrical circuitry including circuits for operating components of an engine, circuits for instruments, circuits for lights; circuits for radios and other avionics, circuits for operation of electro-mechanical devices, etc. Such circuits are controlled by on-off switches, but the primary control is the main battery switch which over-rides most electric circuits and provide power for all the circuits. Internal combustion piston engines for aircraft usually are provided with ignition current from magnetos, most commonly two to an engine. The magneto circuit includes a multiple position switch, and the circuit will only operate with the magneto switch on. Most of the other circuits can only actuate with the main power switch in the on position. Some circuits are actuated on turning on the main power switch, so that it acts as the on-off switch for such circuits. Thus, when the main power switch is turned on, some circuits are actuated and there is a drain on the aircraft battery. While the drain is not large, it will run down a battery over a relatively short period of time.

In many light, single engine aircraft, a key ignition lock is provided as a safety precaution against unauthorized use. The ignition lock is, also, usually the starter switch, but for engine operation, the main power switch is required to be in the "on" position, and the magneto switch must be in the "both" position. The engine may be started, and any of the other desired circuits may be activated. When the flight is completed, the pilot should turn off the circuits to the lights, radios, etc. and the engine is stopped by turning the magneto switch to "off". Immediately prior to departure from the aircraft cockpit, the main power switch should be turned off. However, it not infrequently happens that the pilot fails to turn off the main power switch, with the result of a dead battery. Since a number of switches must be turned off, and considerable noise is audiable from running down gyro instruments, even very experienced pilots as well as novices have left the main power switch "on", with the resultant "dead" battery for the next use of the aircraft.

OBJECTS AND ADVANTAGES OF THE INVENTION

It is, therefore, an object and advantage of the invention to provide an alarm for left on power switches in multiple switch circuitry.

Another object is to provide an audio alarm for a left on aircraft main power switch.

Still another object of the invention is to provide a simple clock circuit to activate an audio-alarm for accidently left on circuits.

A further object of the invention is to provide a clock circuit which is activated and set by charging a multiple component aircraft circuit, and which is triggered to an alarm state by failure of an operator to correctly deactivate the proper portions of the circuit.

Still another object of the invention is to provide a timed audible alarm for light aircraft, arranged with a Bendix key switch, which sounds when the magnato and key switches are turned off and the main power switch is accidently left on.

These and further objects of the invention may be readily ascertained by reference to the following description and appended illustrations.

GENERAL DESCRIPTION OF THE DRAWINGS

SPECIFIC DESCRIPTION OF THE DRAWINGS

Figure 1:
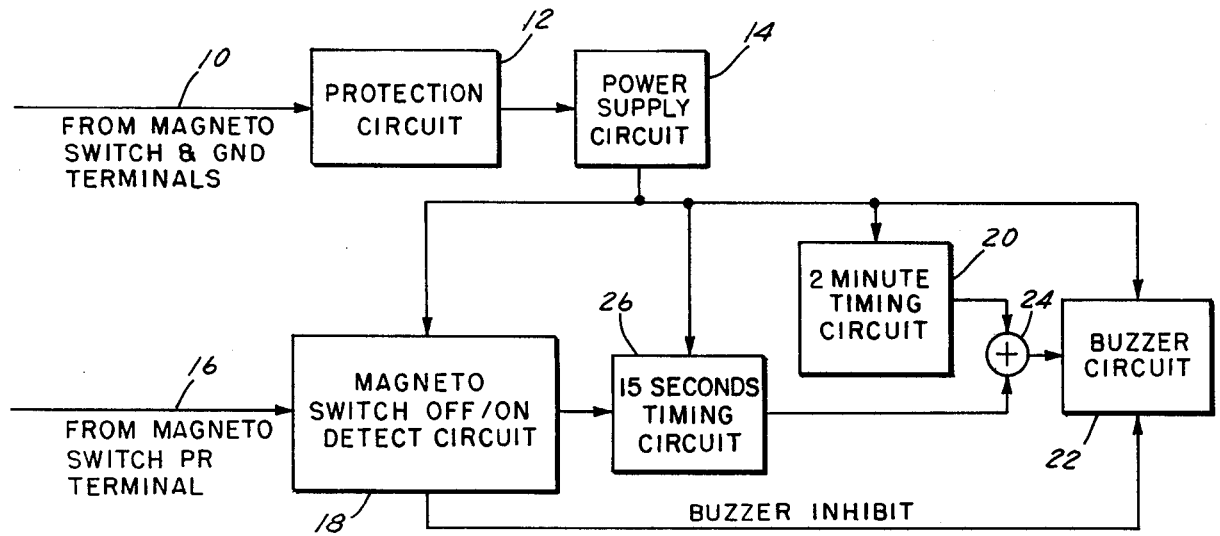
FIG. 1 is a block diagram of the system according to the invention.

The block diagram shows the major circuit elements of an alarm system. The leads of power line 10, from the battery and ground terminals of the magneto switch of a light aircraft with a reciprocating engine pass through a protective circuit 12, so that all power going into the alarm circuit must pass through the protective circuit, which protects the circuits against catastropic failure by momentary or other over-voltages. The power supply circuit divides the current received from the protective unit. A line 16 from the power terminal of the magneto switch enters a detector circuit 18 which detects an "off" or "on" condition of the magneto switch. Thus, when the main power switch (master switch) is on, power is supplied to the unit. Power from the supply circuit 14 charges a two minute timing circuit 20, and it is activated when the magneto switch is turned on. When charged this circuit inhibits a buzzer circuit 22 through a block circuit 24. A fifteen second timing circuit 26 is activated when the detector circuit 18 detects an off condition of the magneto switch and the master switch is on; the buzzer circuit is activated in about 15 seconds. If the master switch is turned on and the magneto switch is not turned on the buzzer circuit is activated after two minutes by the two minute timing circuit. This timing circuit is reset by flipping the main switch off then on. As along as the main and the magneto switches are turned on the buzzer is inactivated.

Figure 2:
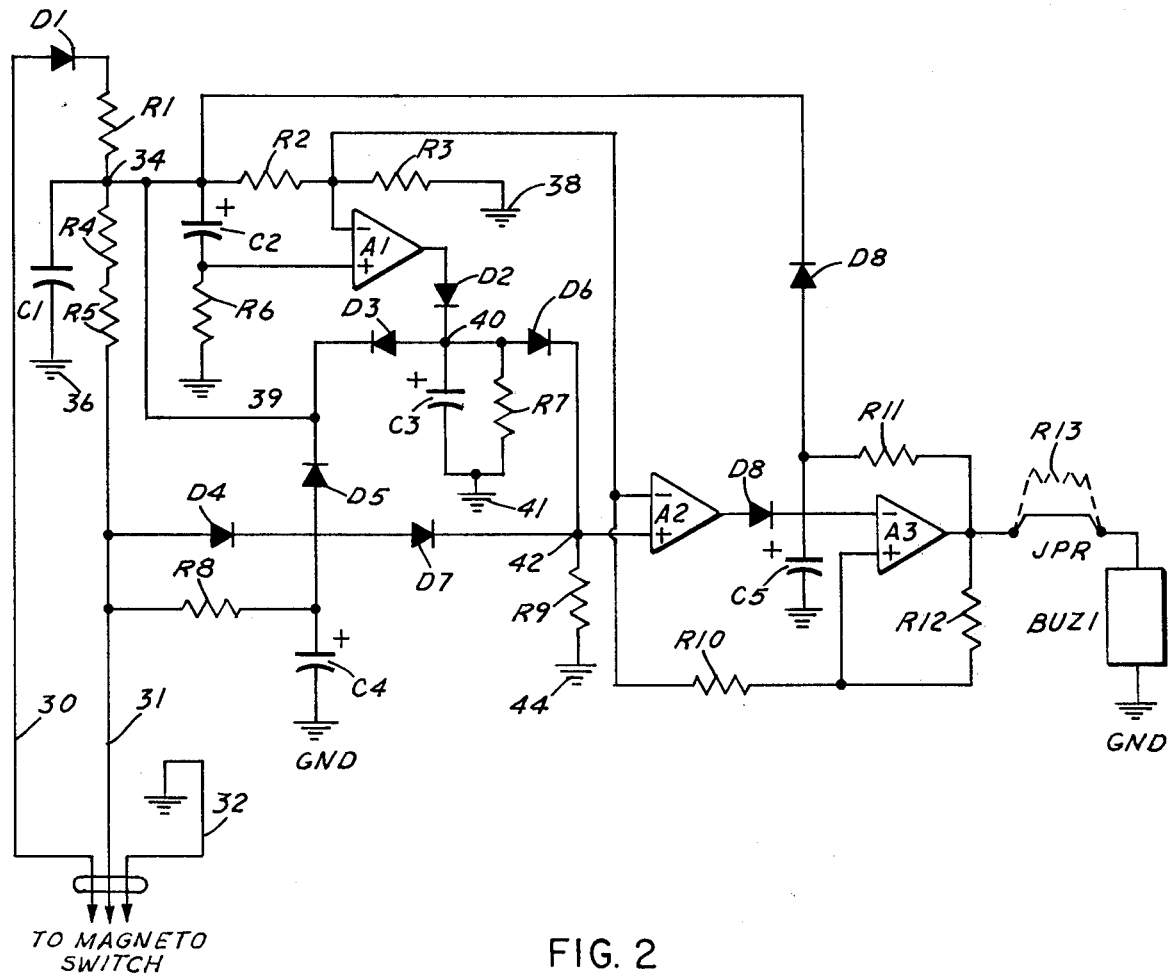
FIG. 2 is a circuit diagram of one circuit for alarm system for a light aircraft.

The circuit of FIG. 2 includes leads 30, 31 and 32 (as a 3 lead cable) connected to terminals at the magneto switch as above. Lead 30 connects to diode D1 (IN4148) through resistor R1 (2 ohm) for voltage control at junction 34. Lead 31 connects through resistor R5 and in series with resistor R4 to connect at 34. Both R4 and R5 are 47K ohm, ¼ watt, 5% carbon film resistors. A capacitor C1 (3.3 microfarad) has a lead connected to 34 and its other lead to ground 36. A divider network comprising series connected resistors R2 and R3 (both 47K ohm ¼ watt, 5% carbon film risistors) to ground 38, sets a voltage reference used by the remainder of the circuit.

A two minute timing circuit consists of capacitor C2 (1.0 microfared) connected in the line ahead of R2 on one side and to a resistor R6 (1M ohm 5% carbon film resistor) which is connected to ground 39, and amplifier A1 (SA534N). The charging pulse to the two minute timing circuit is generated when A1 is held to a high output by R6 as C2 charges. When the voltage at R6 drops below A1's reference, output drops to a low state and diode D2 (IN4148) connected to the A1 becomes reverse biased. Diode D2 is connected into a junction 40 into which is connected D3 and D6 (both IN4148), along with capacitor C3 (22 microfarad capacitor). Resistance R7 (20M ohm) is connected ahead of D6 (IN4148) on one side and to ground 41 along with the capacitor C3. Diode D6 is connected to junction 42 to which is connected resistor R9 (20M ohm) which is connected to ground 44. The circuit of capacitor C3 and resistors R7 and R9 form the two minute timing circuit. As stated, with the capacitor C3 in a high state, the output of A2 (SN534N) is high and the buzzer circuit is inhibited. The diodes D6 and D7, along with resistor R9 and amplifier A2 constitute an "or" gate for the buzzer.

As soon as the charging pulse to capacitor C3 is completed, the capacitor begins to discharge through resistors R7 and R9. When the voltage drops below the reference voltage (approximately 2 minutes), the output of A2 drops, provided no other high voltage is applied, and the buzzer Buz 1 is activated. The buzzer is an SMB-12 buzzer. This occurs when the output of A2 drops to a low state, diode D8 (IN4148) is reverse biased causing oscillation of an astable multibrator which is composed of capacitor C5 (1.0 microfarad) amplifier A3 (SA435N), resistors R10 (1M ohm), R11 47OK ohm) and R12 (1M ohm). When capacitor C5 is held at a high voltage state, this oscillator circuit is unable to oscillate. When amplifier A2 switches low, amplifier A3 oscillates from a high state to a low state with a period of approximately 1 second, turning the audible buzzer on and off.

The aircraft circuit found in many light aircrafts, particularly with a Bendix key switch, the power terminal of the magneto switch is internally connected to the start terminal, when the switch is in the off position. The start terminal is in turn connected to ground through the starter solenoid. When the master switch is turned on, with the magneto switch in off position, the capacitor C4 is discharged to ground through resistor R8. When the magneto switch is turned on, capacitor C4 is allowed to charge through resistors R4 and R5 and it remains charged as long as the magneto switch is not turned to the off position. Thus, as long as capacitor C4 is charged amplifier A2 is held in a high state inhibiting the buzzer circuit regardless of what charge is on capacitor C3 of the two minute timing circuit. When the magneto switch is turned off, capacitor C4 begins to discharge through resistor R8, and C4 drops below the reference voltage (approximately 15 seconds), amplifier A2 will switch to a low voltage state, assuming that capacitor C3 is also below the reference voltage. In the event that capacitor C3 has not fallen below the reference voltage, it will hold amplifier A2 in a high state, until it does fall below the reference voltage. Diodes D3, D5 and D9 (all IN4148) are provided in the circuit to permit the capacitors to discharge when power is cut off from the circuit, and thus protect the integrated circuits. Turning the master switch off and then back on resets the two minute time circuit, usefull for mechanics working in the cockpit.

What is claimed is:

1. An alarm circuit for indicating a main power switch on with the magneto switch off in a light aircraft comprising:
    (a) power line means connected to the battery, ground and magneto power terminals of a magneto switch,
    (b) power divider circuit means electrically connected in said power line means providing a reference voltage powering an audio alarm circuit,
    (c) magneto on-off detector circuit means electrically connected with the power line means to inhibit the audioalarm circuit when the power switch and magneto switch are in the on position thereby providing an inhibiting voltage that the voltage to it is above the reference voltage,
    (d) long period timing circuit means electrically connected to a reference voltage line to the audio alarm circuit for inhibiting the audioalarm circuit while in a charged high state from the current in the power line above the reference voltage when the power and magneto switches are on and to discharge after a predetermined time when the power switch is turned on and the magneto switch is off so as to activate the audioalarm circuit
    (e) short period timing circuit means, electrically connected with the power line means and an output line from the detector circuit means providing a current output after a predetermined time when the inhibiting voltage in said magneto on-off detector circuit means drops below the reference voltage, when the magneto switch is turned off and the main power switch is in the on position, and
    (f) said audioalarm circuit means activated by current output from said short period timing circuit means.

2. An alarm circuit according to claim 1, wherein said long period timing circuit is a capacitor-resistor circuit providing about a 2 minute time interval when its charge drops to a low state when the magneto switch is off and the power switch is turned on and the voltage drops below the reference voltage to no longer inhibit the audio alarm circuit to thereby activate said audioalarm circuit.

3. An alarm circuit according to claim 1, wherein said short period timing circuit is set for about 15 seconds to activate said audioalarm circuit means when the main power switch is on and the magneto switch is turned off.

4. A method of indicating the on position of the main power switch in a reciprocating engine aircraft having a magneto switch and a audioalarm, comprising:
    (a) activating a power supply circuit by activating the main power switch to provide output currents,
    (b) detecting the on position of a magneto switch when the main switch is on to pass a first current from the output current,
    (c) charging a long period timing circuit with said first current to block current to the audioalarm so long as said first current flowing and discharge the long period timing circuit when the power is turned on and the magneto switch remains off to unblock current to the audioalarm,
    (d) charging a short period timing circuit with a second current from the power supply when the power supply curcuit is on and the magneto circuit is on to prevent passing a third current, and discharging said short period timing circuit when the magneto switch is turned off and the main switch is on to produce a third current after a predetermined time, and
    (e) passing said third current to activate the audioalarm.

5. A method according to claim 4, wherein current is passed from said long period timing circuit to said audioalarm after a predetermined time when the first current drops below that necessary to charge said long period timing circuit.

* * * * *